United States Patent [19]

Gallagher

[11] 3,782,080
[45] Jan. 1, 1974

[54] AIR WASHER

[75] Inventor: Edward F. Gallagher, Union Lake, Mich.

[73] Assignee: Gallagher-Kaiser Corporation, Detroit, Mich.

[22] Filed: Apr. 11, 1972

[21] Appl. No.: 242,933

[52] U.S. Cl............... 55/226, 55/229, 55/240, 55/257, 261/118, 261/126, 261/DIG. 54
[51] Int. Cl............................................. B01d 47/00
[58] Field of Search............ 261/118, 126, DIG. 54; 55/223, 226, 229, 240, 257

[56] References Cited
UNITED STATES PATENTS

| | | | |
|---|---|---|---|
| 3,119,675 | 1/1964 | Gallagher............................. | 55/240 |
| 3,191,364 | 6/1965 | Sylvan.................................. | 55/257 |
| 3,350,076 | 10/1967 | Crommelin, Jr.................... | 261/118 |
| 3,601,374 | 8/1971 | Wheeler.............................. | 261/DIG. 54 |

Primary Examiner—Tim R. Miles
Assistant Examiner—Steven H. Markowitz
Attorney—J. King Harness et al.

[57] ABSTRACT

An air washer for removing relatively small particles from the air. An annular passage is disposed within the lower end of a plenum chamber or eliminator which is mounted above a collection trough. The passage has a water pipe descending therethrough, the water impacting a deflector which sprays the water across the mouth of the passage. An enlargement is removably mounted on the pipe to decrease the size of the passage. Air is drawn upwardly through the passage, the velocity increasing due to the narrow size, and the water is broken up into small droplets which surround the particles. An impact plate immediately above the narrow passage returns the water-enveloped particles to an annular catch basin which surrounds the narrow passage. A return pipe leads from this basin to the trough. The enlargement may be replaced with one of a different size, to obtain the optimum velocity for removing particles of a given type or size.

13 Claims, 2 Drawing Figures

PATENTED JAN 1 1974  3,782,080
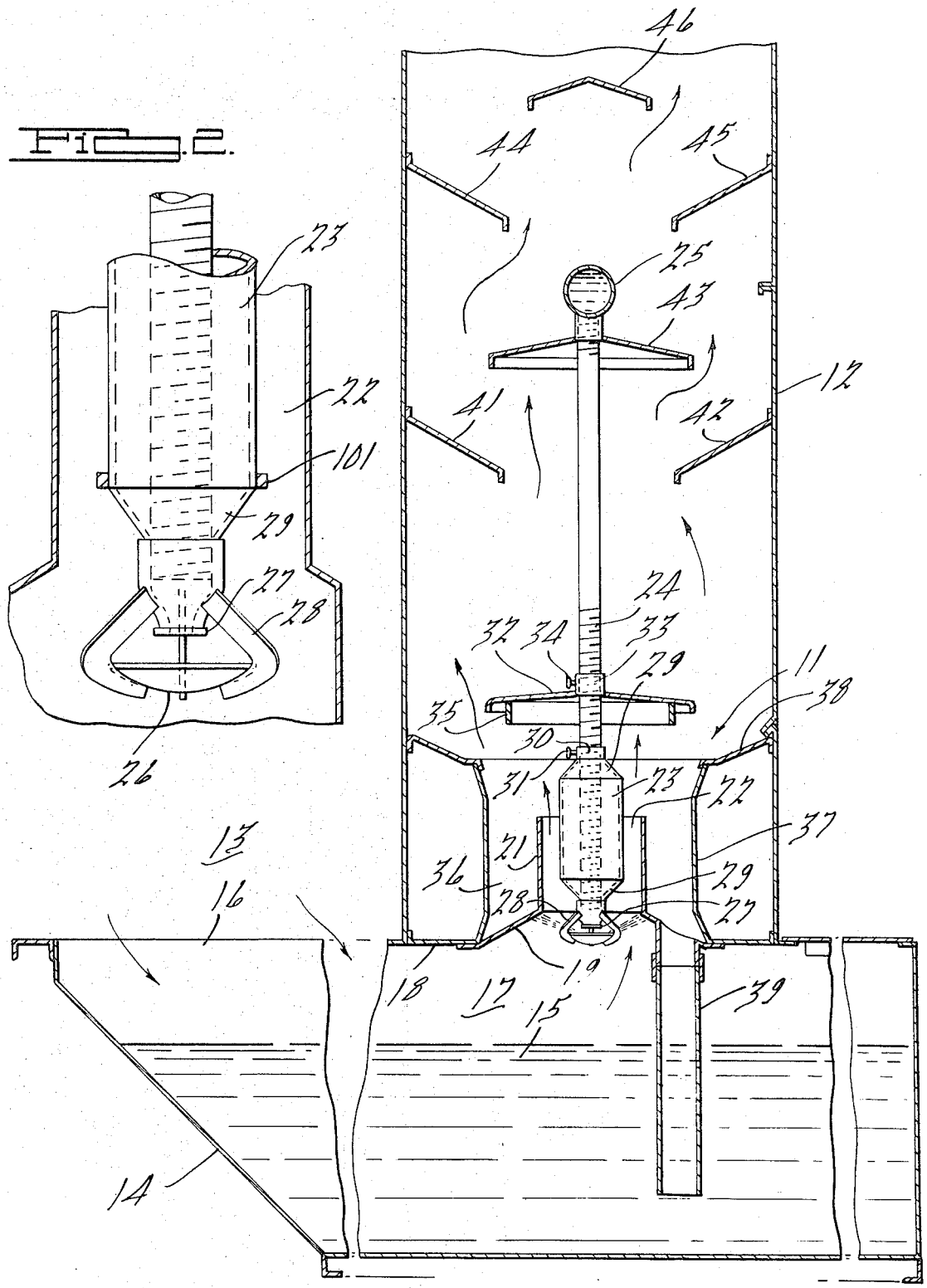

AIR WASHER

BACKGROUND OF THE INVENTION

1. Field of the Invention

The invention relates to air washers, and more particularly to devices for removing relatively small particles such as acrylic paints in a spray booth from the air. The recovery of small particles of this type, perhaps as small as the order of one micron in diameter, is difficult with presently available equipment and is especially desirable in view of modern anti-pollution regulations.

2. Description of the Prior Art

My U.S. Pat. No. 3,119,675, issued Jan. 28, 1964, disclosed a spray booth in which upwardly flowing air in a cylindrical wash chamber passes through a water spray and then impacts a deflector plate. Although this equipment has been satisfactory for many uses, it has been found that in certain applications involving very small particle sizes the apparatus is less efficient. For example, acrylic paints when used in industrial spray booths have smaller pigment particle sizes than enamel paints, and the previous apparatus is often ineffective in removing such small particles from the air.

Other known prior art constructions include the following: Hausberg U.S. Pat. No. 3,140,163 and Hardison et al. U.S. Pat. No. 3,546,851. However, these constructions have various deficiencies in terms of size and efficiency of operation which will become apparent from the following disclosure.

BRIEF SUMMARY OF THE INVENTION

It is an object of the present invention to provide a novel and improved air washer especially adapted for removing very small foreign particles from air, which is extremely compact, quiet and efficient in operation and will remove a high percentage of particles.

It is a further object to provide a device of this type which is relatively simple in construction and economical to fabricate and maintain.

BRIEF DESCRIPTION OF THE DRAWINGS

FIG. 1 is a side elevational view in cross section of the air washer of this invention installed below a plenum chamber or eliminator, and FIG. 2 is an enlarged fragmentary cross-sectional view of the high velocity passage and water deflector.

DESCRIPTION OF THE PREFERRED EMBODIMENT

The air washer of this invention is generally indicated at 11 and is mounted below a plenum chamber or eliminator 12 similar to that of the afore-mentioned copending application. The eliminator may form part of a paint spray booth or be disposed in another location where air-containing foreign particles are to be cleaned, this location being to the left of eliminator 12 in FIG. 1 and indicated by the reference numeral 13. Eliminator 12 surmounts a collection trough 14 containing water 15 and having an upwardly facing intake 16. As shown in the aforementioned patent, a series of wash chambers 11 may extend along eliminator 12, and a vacuum is created in the eliminator and wash chambers by an exhaust fan mounted above. Air mixed with the paint spray or other particles passing through intake aperture 16, which may or may not be initially washed by a sheet of water flowing downwardly over the front face of the eliminator, will be drawn upwardly through air washers 11 and eliminator 12 and the clean air exhausted to the atmosphere.

The air is guided from the space 17 above collection trough water 15 into air washer 11 by means of a horizontal wall 18 at the bottom of the eliminator and a frustoconical wall 19 leading upwardly through an intermediate portion of wall 18 to a cylindrical wall 21. This wall forms the outside of a narrow annular passage 22, the inside of this passage being defined by an enlargement 23 adjustably and removably secured to a central water pipe 24 which descends within wall 21. The water pipes for the air washers lead downwardly from a common horizontal header 25 extending through eliminator 12.

A deflector 26 is secured below a nozzle 27 which is threaded onto the bottom of pipe 24. This deflector is saucer-shaped and is supported below the nozzle by a plurality of circumferentially spaced arms 28. Water deflected from member 26 will be sprayed radially outwardly and upwardly in small droplets against frustoconical plate 19, so that foreign particles in the air passing upwardly therethrough will be enveloped. Some of these particles will be returned by plate 19 to trough 14.

The construction of enlargement 23 is best seen in FIG. 2. This member is of generally cylindrical shape but has upper and lower frustoconical portions 29, the upper being surmounted by a collar 30 having a thumbscrew 31. Member 23 is slidable on pipe 24 and is adjustable to various positions, being secured by the thumbscrew. Thus, the length of narrow passage 22 defined by wall 21 and member 23 may be varied to suit requirements. The length as well as the cross-sectional area of passage 22 will determine the degree to which the air increases its velocity. Enlargement 23 may be replaced with one of a different diameter by unscrewing nozzle 27 and loosening thumbscrew 31. It has been found for example that the optimum velocity for removing acrylic paint particles is higher than that for enamel paints. The interchangeability of enlargement 23 will insure maximum efficiency, regardless of the particles to be removed. The air with any remaining entrained particles will pass upwardly through eliminator 12 past deflectors 41 through 46 to the exhaust duct.

A baffle plate 32 of circular shape is secured by a collar 33 and wing nut 34 to pipe 24 a short distance above the upper end of passage 22. This baffle plate is of dish-shaped construction with an additional annular wall 35 secured therewithin to minimize surge. Air with entrained water rushing upwardly through narrow passage 22 will strike plate 32 and be deflected outwardly and downwardly, the flow being further deflected downwardly by annular member 35.

A catch basin 36 is formed beneath 32, this basin being of annular shape and surrounding passage 22. The catch basin is formed by wall 21 and an annular wall 37 spaced outwardly therefrom. Wall 37 is higher than wall 21 and is connected to the sides of eliminator 12 by a plate 38. A downspout 39 is connected to the bottom of catch basin 36 and leads downwardly below the surface of water 15 in trough 14.

A plurality of deflectors 41, 42, 43, 44, 45 and 46 are disposed in eliminator 12 above air washer 11, and any remaining entrained particles in the air leaving the washer are susceptible of being caught by these deflectors.

In operation, members 23 and 32 will be vertically adjusted and the proper size of member 23 chosen to suit the particular requirements of the system. In particular, the length and cross-sectional area of each narrow passage 22 and the restriction above this passage created by baffle 32 will be selected to achieve the desired volumetric rate of air flow, depending on the sizes and amounts of the particles to be removed, and the distance between the wash chamber and the exhaust duct.

Upon starting of the exhaust fan, air will flow downwardly and inwardly through opening 16 with entrained particles being trapped in trough 14. The air will then be drawn into air washer 11 and the water spray from member 26. The fine particles of water from this spray will surround even the finer particles entrained in the air. The air will then enter narrow passage 22 where its speed will increase considerably. This high velocity air with its entrained water droplets and foreign particles will strike baffle plate 32 and be deflected downwardly and outwardly around plate 35. The fact that the velocity of the air, water droplets and particles is so high will be of great assistance in removing the droplets and foreign particles from the air. It will observed that the diameter of baffle 32 is considerably greater than the outside diameter of passage 22 and is substantially the same as that of catch basin 36. The water droplets and foreign particles will thus drop into the catch basin where they will be collected and run down through drain 39.

As a modification of this invention, additional means for varying the cross-sectional area of passage 22 may be provided in the form of the collar 101 removably mounted and secured to enlargement 23 as shown in FIG. 2 by any appropriate means. This collar affords a convenient way of accurately determining the optimum area for passage 22 without the necessity of providing a number of different sizes of enlargement 23.

I claim:

1. In an air washer, a descending water pipe having a nozzle at its lower end, deflector means spaced downwardly from said nozzle for creating outwardly moving droplets of water, an air space below said deflector, means spaced above said air washer for drawing air into said space and upwardly through said droplets, a relatively narrow annular passage extending upwardly beyond said droplets, said passage being formed by a cylindrical member mounted on and spaced radially outwardly from said water pipe and a first annular wall spaced outwardly from and surrounding said last-mentioned member, an annular catch basin surrounding said passage including a second annular wall spaced outwardly from said first annular wall, a knockout baffle plate mounted a relatively short distance above the top of said narrow passage whereby the high velocity air passing upwardly through the passage will strike said knockout baffle and be deflected thereby, the diameter of said knockout baffle being considerably greater than that of the annular wall which forms the outside of said narrow passage so that water droplets and foreign particles entrained in the air will drop into said catch basin, and means for draining water and foreign particles from the catch basin.

2. The combination according to claim 1, further provided with a frustoconical wall leading from said air space to the bottom of said annular wall forming the outside of the passage, said drain means comprising a downspout in said frustoconical wall.

3. The combination according to claim 1, said member having a main portion of cylindrical shape, and means for vertically adjusting the position of said member on said water pipe.

4. The combination according to claim 1, said deflector being dish shaped, and means for supporting said deflector comprising a plurality of circumferentially spaced arms secured to said nozzle.

5. The combination according to claim 4, further provided with a frustoconical wall extending outwardly from the bottom of said annular passage and forming the bottom of said catch basin.

6. The combination according to claim 1, said baffle being of relatively flat circular shape, a cylindrical member secured to the underside of said baffle and forming part thereof, and means for adjustably securing said baffle to said water pipe.

7. The combination according to claim 1, said cylindrical member being removably mounted on said water pipe and replaceable by similar members of different diameters whereby the cross sectional area of said passage may be varied.

8. The combination according to claim 7, said nozzle being threaded onto the bottom of said water pipe, said cylindrical member having frustoconical ends engaging the water pipe, whereby the cylindrical member may be replaced by unscrewing the nozzle and slipping off the cylindrical member.

9. In an air washing apparatus, a collection trough having water therein, an eliminator mounted on and extending upwardly from said trough, an air washer mounted in the bottom of said eliminator, means surrounding said eliminator for drawing air into said collection trough, upwardly through said air washer and through said eliminator, the air washer comprising a water pipe extending downwardly from said eliminator, a nozzle at the bottom of said water pipe, a deflector supported below said nozzle for creating a spray of outwardly moving water particles, means leading air from said collection trough upwardly through said water particles, a relatively narrow annular flow passage extending above said water particles, said passage being formed by an annular enlargement mounted on and extending radially outwardly from said water pipe and an annular wall outwardly of and surrounding said enlargement and spaced a substantial distance inwardly from the sides of said eliminator, a knockout baffle mounted a relatively short distance above the top of said narrow passage and having an outer diameter substantially greater than said passage, an annular catch basin outwardly of and surrounding said narrow flow passage and below the outer portions of said knockout baffle, and a downspout leading from the bottom of said catch basin to said collection trough.

10. The combination according to claim 9, further provided with means for vertically adjusting the position of said enlargement on said water pipe, said baffle being also mounted for vertical adjustment on the water pipe.

11. The combination according to claim 9, further provided with a frustoconical wall extending outwardly from the bottom of said narrow passage and forming the bottom of said catch basin.

12. The combination according to claim 9, said enlargement being removably mounted on said water pipe whereby it may be replaced with enlargements of different diameters.

13. The combination according to claim 9, further provided with a collar removably mounted on said enlargement.

\* \* \* \* \*

UNITED STATES PATENT OFFICE
CERTIFICATE OF CORRECTION

Patent No. 3,782,080      Dated January 1, 1974

Inventor(s) Edward F. Gallagher

It is certified that error appears in the above-identified patent and that said Letters Patent are hereby corrected as shown below:

Column 3, line 24, after "will" insert --be--.
Column 4, line 32 and 33, (claim 9) "surrounding" should be --surmounting--.

Signed and sealed this 4th day of June 1974.

(SEAL)
Attest:

EDWARD M. FLETCHER, JR.
Attesting Officer

C. MARSHALL DANN
Commissioner of Patents